(No Model.)
A. S. ATWATER.
DYNAMO ELECTRIC MACHINE.
No. 505,622. Patented Sept. 26, 1893.
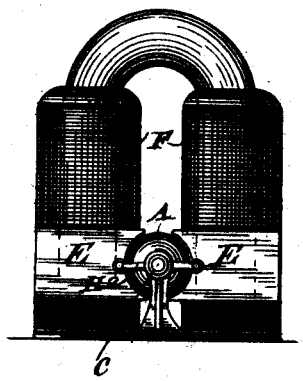
Fig. 2.
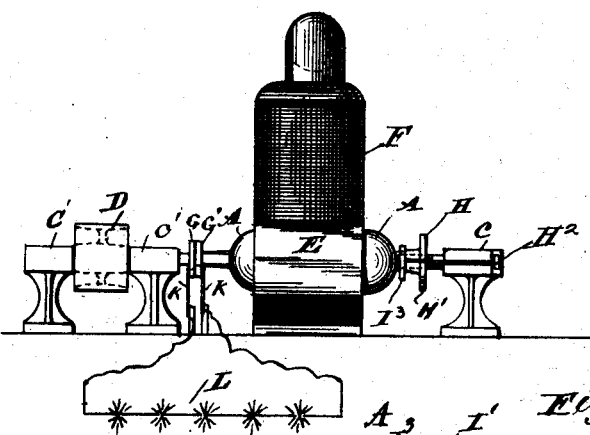
Fig. 1.
Fig. 1a.
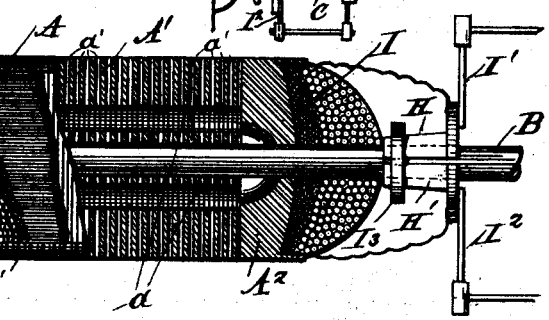
Fig. 3.
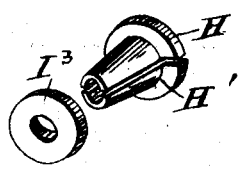
Fig. 4.
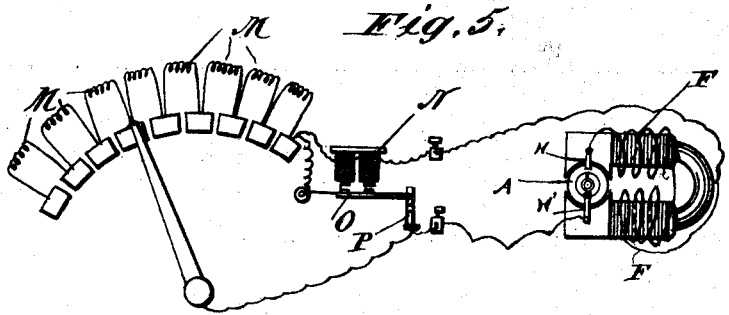
Fig. 5.
Witnesses
Frank B. Many
E. E. Green
Inventor
Arthur S. Atwater
by Wm. M. Monroe,
Attorney

UNITED STATES PATENT OFFICE.

ARTHUR S. ATWATER, OF CLEVELAND, OHIO, ASSIGNOR TO THE ATWATER GENERAL ELECTRIC COMPANY, OF SAME PLACE.

DYNAMO-ELECTRIC MACHINE.

SPECIFICATION forming part of Letters Patent No. 505,622, dated September 26, 1893.

Application filed January 23, 1893. Serial No. 459,491. (No model.)

*To all whom it may concern:*

Be it known that I, ARTHUR S. ATWATER, a citizen of the United States, and a resident of Cleveland, county of Cuyahoga, State of Ohio, have invented certain new and useful Improvements in Dynamo-Machine Twice-Wound Armatures, of which I hereby declare the following to be a full, clear, and exact description, such as will enable others skilled in the art to which it appertains to make and use the same.

My invention relates to improvements in dynamo machines, in which the poles are excited by a separate coil winding of the armature.

My invention is an improvement upon Letters Patent No. 411,950, granted to me October 1, 1889, in which is shown a ventilated armature, provided with one coil of wire wound lengthwise of the axis. In this application, I add to the device shown a second coil for the purpose of exciting the poles of the dynamo; with the accompanying, controlling and collecting devices and details of construction, as hereinafter described, shown in the accompanying drawings, and more specifically pointed out in the claims.

In the accompanying drawings Figure 1 is a side elevation of the complete dynamo. Fig. 1$^a$ is a view of the commutator and brushes in plan. Fig. 2 is an end elevation of the dynamo. Fig. 3 is a detail of armature partially broken away to show ventilation and winding. Fig. 4 is a perspective view of the duplex commutator and Fig. 5 is a rheostat connection for the same.

In these views A, is the armature of the dynamo, secured upon the shaft B, which is mounted upon the bearings C, C', two of which sustain the pulley D between them.

E E are the poles and F, are the spools.

G, G', are collectors insulated from the shaft and from each other.

H, and H', are the two halves of the commutator, which are connected respectively with the two extremities of the inner coil of fine wire I wound upon the armature A and brushes I', I$^2$, convey the current to the coil wound about the poles A. Ring I$^3$ of insulating material clamps the commutator halves upon the shaft, while the collectors G, and G', are respectively connected with the extremities of the coarse wire J, which is coiled over the armature A outside of the wire I. Brushes K take off the current from the collectors G, G', and convey them to the lamp series shown at L.

The armature A is provided as described with the laminated plates A', perforated at $a$, and provided with radial passages stamped therein as at $a'$.

A$^2$ are soft iron end pieces of the same outline as the thin plates A'.

In order to give the shaft great rigidity and great bearing surface, two bearings are employed on one side of the dynamo, between which is placed the pulley D, while the outer bearing supports the brush holder H$^2$. It will be seen that the brushes are held flat against the end of the double commutator instead of against the periphery, the advantage of which is to avoid unnecessary friction and wear, the surface of the end of the commutator not rotating as rapidly as the periphery. The brushes bearing upon the collector disks are also similarly arranged for the same reason, a further advantage gained being that the point of commutation remains the same until the brushes wear out.

It is obvious that the current supplied to the lamps will be alternating, while that supplied to the pole coils will be broken by the commutator, and hence will be continuously in one direction.

A separate view of the commutator is shown in Fig. 4, H, H', being the halves thereof, and I$^3$, the clamping ring.

In Fig. 5 is shown a rheostat M used in connection with the dynamo, including a shunt device consisting of a magnet N and spring armature O, which will cause the positive and negative ends of the rheostat to be short circuited, and cut out the rheostat, when the dynamo is quiet, and continue to cut out the rheostat until considerable power has been generated in the dynamo, when the short circuit will be removed and the necessary resistance supplied from the armature to field coils. As seen in the figure, this is accomplished by the spring armature O, which normally crosses the field circuit at P, but when sufficient current is generated in the magnet N, the armature O, is lifted and the circuit will pass uninterruptedly through the rheostat. The advantage of this device will be found in the freedom given the current when too weak to pass through the necessary resistance coils, as when from any cause the resistance is lessened in the lamp circuit.

In my former invention I described the detail construction of my ventilated armature, but did not add the essential elements comprising a complete and operative dynamo machine.

If desired one of the collector rings may be dispensed with and the other terminal secured to the shaft, whence the current can be taken off through a binding post in the bearing or bed plate.

Having described my invention, what I claim as new, and desire to secure by Letters Patent, is—

1. In a dynamo in combination with a ventilated armature core, provided with perforated and radially stamped laminæ, a main shaft passing through said core, duplicate taper commutator, sections, secured to said shaft by an insulated clamping ring, a field exciting coil about said core terminating in the duplicate commutator sections respectively, and brushes radially placed in relation to, and bearing upon the ends of the said commutator sections, and attached to the terminals of the field coil.

2. In a dynamo machine, a duplex commutator consisting in duplicate taper sections provided each with a terminal semiannular flange, and an insulated clamping ring therefor in combination with radially arranged brushes, adapted to bear upon the outer faces of the sections and flanges, substantially as described.

3. In a dynamo machine, a duplex commutator consisting in duplicate taper sections provided with shaft insulation and separated from one another, in combination with an insulated clamping ring, and radial brushes, adapted to bear upon the ends of said sections, substantially as described.

4. In a dynamo machine, the combination with a ventilated armature, of a coarse generating coil upon said armature for the lamp circuit, collector rings and radial brushes connecting said coarse coil and lamp circuit, a fine coil for field excitation upon said armature, a duplex commutator and radial brushes, connecting said fine coil with the field coil, a rheostat in said field circuit, and a cutout in said rheostat whereby the rheostat is short circuited until the machine has developed normal power, substantially as described.

ARTHUR S. ATWATER.

Witnesses:
WM. M. MONROE,
CHARLES METCALF.